United States Patent [19]

Edmonds, Jr. et al.

[11] 4,038,263

[45] July 26, 1977

[54] PRODUCTION OF P-PHENYLENE SULFIDE POLYMERS

[75] Inventors: James T. Edmonds, Jr.; Robert W. Campbell, both of Bartlesville, Okla.

[73] Assignee: Phillips Petroleum Company, Bartlesville, Okla.

[21] Appl. No.: 581,343

[22] Filed: May 27, 1975

[51] Int. Cl.² .................................................. C08G 75/16
[52] U.S. Cl. .................................... 260/79.1; 260/79
[58] Field of Search ................................ 260/79, 79.1

[56]  References Cited
U.S. PATENT DOCUMENTS

| | | |
|---|---|---|
| 3,562,199 | 2/1971 | Hill, Jr. et al. ............................ 260/79 |
| 3,607,843 | 9/1971 | Vidaurri, Jr. ............................ 260/79 |
| 3,725,362 | 4/1973 | Walker ............................ 260/79 |
| 3,763,124 | 10/1973 | Edmonds, Jr. ............................ 260/79 |
| 3,786,035 | 1/1974 | Scoggin ............................ 260/79 |
| 3,919,177 | 11/1975 | Campbell ............................ 260/79 |

*Primary Examiner*—Melvyn I. Marquis

[57]  ABSTRACT

A method by which p-phenylene sulfide polymers are produced by admixing p-dihalobenzene, an alkali metal sulfide, an organic amide, a lithium halide, and optionally, a base, at polymerization conditions thereby producing a polymer of higher molecular weight as evidenced by lower melt flow and higher inherent viscosity than is obtained without the addition of the lithium halide.

15 Claims, No Drawings

PRODUCTION OF P-PHENYLENE SULFIDE POLYMERS

BACKGROUND OF THE INVENTION

This invention relates to the production of p-phenylene sulfide polymers. In one of its aspects this invention relates to a novel method for producing novel p-phenylene sulfide polymers, and to the polymers themselves. In another of its aspects this invention relates to the use of lithium halide admixed into the polymerization mixture in the production of p-phenylene sulfide polymers. In another of its aspects this invention relates to producing p-phenylene sulfide polymers of higher molecular weight by using a specific chemical compound in the reaction mixture than are produced without the use of the specific chemical compound.

The preparation of p-phenylene sulfide polymers having higher molecular weight as evidenced by lower melt flow without curing the polymers as compaared to p- phenylene sulfide polymers known in the art is of particular interest since lower melt flows, particularly within the range of about 1 to about 700 as determined by the method of ASTM D 1238-70, are particularly useful in the production of fibers, molded objects and films since the usual curing step is obviated.

It is therefore an object of this invention to produce p-phenylene sulfide polymers of lower melt flow as compared to that of those produced by prior art methods.

Other aspects, objects and the various advantages of this invention will become apparent on reading this specification and the appended claims.

STATEMENT OF THE INVENTION

In accordance with this invention, in the production of a p-phenylene sulfide polymer by forming a composition by contacting a p-dihalobenzene, an alkaki metal sulfide, an organic amide, and optionally a base at polymerization conditions, the addition of a lithium halide to the polymerization composition results in recovery of higher molecular weight polymer as evidenced by lower melt flow than obtained without the addition of lithium halide.

In one embodiment of the present invention, at least one p-dihalobenzene is reacted, under polymerization conditions for a period of time sufficient to form a p-phenylene sulfide polymer, with a mixture in which at least one alkali metal sulfide, at least one lithium halide selected from lithium chloride, lithium bromide, and lithium iodide, and at least one organic amide are contacted.

In another embodiment of this invention, at least one p-dihalobenzene is reacted, in the presence of at least one lithium halide selected from lithium chloride, lithium bromide, and lithium iodide, under polymerization conditions for a period of time sufficient to form a p-phenylene sulfide polymer, with a mixture in which at least one alkali metal sulfide and at least one organic amide are contacted.

In still another embodiment of this invention, at least one p-dihalobenzene is reacted, in the presence of at least one lithium halide selected from lithium chloride, lithium bromide, and lithium iodide, under polymerization conditions for a period of time sufficient to form a p-phenylene sulfide polymer, with a mixture in which at least one alkali metal sulfide, at least one base, and at least one organic amide are contacted.

p-Dihalobenzenes which can be employed in the process of this invention can be represented by the formula

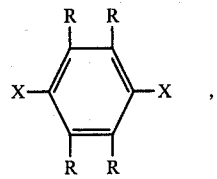

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso thatin at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-choloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl -2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methyl-cyclopentyl)-2,5-dichlorobenzene, and the like, and mixtures thereof.

Alkali metal sulfides which can be employed in the process of this invention include lithium sulfide, sodium sulfide, potassium sulfide, rubidium sulfide, cesium sulfide, and mixtures thereof. The alkali metal sulfide can be used in anhydrous form, as a hydrate, or as an aqueous mixture.

Although the lithium halide can be lithium chloride, lithium bromide, lithium iodide, or any mixture thereof, the lithium halide preferably is lithium chloride or lithium bromide, most preferably lithium chloride.

Bases which can be employed in the process of this invention include the alkali metal hydroxides and the alkali metal carbonates, i.e., lithium hydroxide, sodium hydroxide, potassium hydroxide, rubidium hydroxide, cesium hydroxide, lithium carbonate, sodium carbonate, potassium carbonate, rubidium carbonate, cesium carbonate, and mixtures thereof. The alkali metal hydroxides are preferred.

The organic amides for use in the process of this invention should be substantially liquid at the reaction temperatures and pressures employed. The amides can be cyclic or aryclic and can have 1 to about 10 carbon atoms per molecule. Examples of some suitable amides include formamide, acetamide, N-methylformamide, N,N-dimethylformamide, N,N-dimethylacetamide, N-ethylpropionamide, N,N-dipropylbutyramide, 2-pyrrolidone, N-methyl-2pyrrolidone, ε-caprolactam, N-methyl-ε-caprolactam, N,N'-ethylenedi-2pyrrolidone, hexamethylphosphoramide, tetramethylurea, and the like, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1. When a base is used, the mole ratio of base to alkali metal sulfide can vary over a wide range but generally will be not greater than about 0.8:1, preferably being within the range of about 0.015:1 to about 0.6:1. Although the mole ratio of lithium halide to alkali metal sulfide can vary over a considerable range, depending in part on whether a base is employed, generally it will be within the range of about 0.05:1 to about 4:1, preferably about 0.1:1 to about 2:1, when the mole ratio of base to alkali metal sulfide is at least about 0.015:1. When no base is used, or when the mole ratio of base to alkali metal sulfide is less than about 0.015:1, the mole ratio of lithium halide to alkali metal sulfide generally will be within the range of about 0.05:1 to about 1.5:1, preferably about 0.1:1 to about 1.3:1. The amount of organic amide can vary greatly, generally being within the range of about 100 grams to about 2500 grams per gram-mole of alkali metal sulfide.

Although the reaction temperature at which the polymerization is conducted can vary over a wide range, generally it will be within the range of about 125° C to about 450° C, preferably about 175° C to about 350° C. The reaction time can vary widely, depending in part on the reaction temperature, but generally it will be within the range of about 10 minutes to about 72 hours, preferably about 1 hour to about 8 hours. The pressure should be sufficient to maintain the p-dihalobenzene and organic amide substantially in the liquid phase.

It is to be understood that the process of this invention can be carried out by mixing the p-dihalobenzene, the alkali metal sulfide, the lithium halide, the organic amide, and the base, if used, in any order. It is also to be understood that a composite can be formed of any two or more of these substances with the remaining substance or substances being introduced into the composite. Furthermore, it is to be understood that these substances can be employed in the form of aqueous mixtures or hydrates and that subsequent to any step of contacting substances water can be removed from the resulting composition, e.g., by distillation. For instance, water can be removed by distillation from a mixture of the organic amide, the lithium halide, and the alkali metal sulfide in hydrated form or as an aqueous mixture, after which the residual mixture can be admixed with the p-dihalobenzene and the resulting mixture then maintained at polymerization conditions. Alternatively, and preferably, water can be removed by distillation from a mixture of the organic amide and the alkali metal sulfide in hydrated form or as an aqueous mixture, after which the residual mixture can be admixed with the lithium halide and the p-dihalobenzene and the resulting mixture then maintained at polymerization conditions. More preferably, a base also is added, either before or after the water removal step, preferably prior to the water removal step.

The p-phenylene sulfide polymers produced by the process of this invention can be separated from the reaction mixture by conventional procedures, e.g., by filtration of the polymer, followed by washing with water, or by dilution of the reaction mixture with water, followed by filtration and water washing of the polymer.

The p-phenylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers. Those p-phenylene sulfide polymers having a relatively low melt flow, e.g., within the range of about 50 to about 700 (determined by the method of ASTM D 1238-70, modified to a temperature of 316° C using a 5-kg weight, the value being expressed as g/10 min.), are particularly useful in the production of fibers, molded objects, and films since the usual curing step is obviated.

EXAMPLES

In the following Examples, melt flow values were determined by the method of ASTM D 1238-70, modified to a temperature of 600° F (316° C) using a 5-kg weight, the value being expressed as g/10 min. Values for inherent viscosity were determined at 206° C in 1-chloronaphthalene at a polymer concentration of 0.4 g/100 ml solution. Values for glass transition temperature ($T_g$) and crystalline melting point ($T_m$) were determined on premelted and quenched polymer samples by differential thermal analysis.

EXAMPLE I

In a control run outside the scope of this invention, 65.2 g (60 percent assay, 0.5 mole) sodium sulfide, 0.2 g sodium hydroxide (to react with sodium bisulfide and sodium thiosulfate present in trace amounts in the sodium sulfide), and 158.3 g N-methyl-2-pyrrolidone were charged to a stirred 1-liter autoclave, which was then flushed with nitrogen. Dehydration of the mixture by heating to 205° C yielded 16 ml of distillate containing 14.3 g water. To the residual mixture were charged 74.95 g (0.51 mole) p-dichlorobenzene and 40 g N-methyl-2-pyrrolidone. The resulting mixture was heated for 3 hours at 265° C at a pressure of 75–130 psig. The reaction product was washed eight times with hot water and dried at 80° C under nitrogen in a vacuum oven to obtain a yield of 51.1 g poly(p-phenylene sulfide) having a melt flow of 3843, an inherent viscosity of 0.16, a $T_g$ of 84° C, and a $T_m$ of 285° C.

EXAMPLE II

In a run within the scope of this invention, with the addition of lithium chloride prior to the dehydration step, 65.2 g (60 percent assay, 0.5 mole) sodium sulfide, 0.2 g sodium hydroxide (to react with sodium bisulfide and sodium thiosulfate present in trace amounts in the sodium sulfide), 21.2 g (0.5 mole) lithium chloride, and 158.3 g N-methyl-2-pyrrolidone were charged to a stirred 1-liter autoclave, which was then flushed with nitrogen. Dehydration of the mixture by heating to 205° C yielded 20 ml of distillate containing 17.1 g water. To the residual mixture were charged 74.95 g (0.51 mole) p-dichlorobenzene and 40 g N-methyl-2-pyrrolidone. The resulting mixture was heated for 3 hours at 265° C at a pressure of 75–85 psig. The reaction product was washed eight times with hot water and dried at 80° C under nitrogen in a vacuum oven to obtain a yield of 44.4 g poly(p-phenylene sulfide) having a melt flow of 1308, an inherent viscosity of 0.19, a $T_g$ of 82° C, and a $T_m$ of 285° C.

Thus, based on melt flow and inherent viscosity, the poly(p-phenylene sulfide) produced in this Example was of higher molecular weight than that produced in Example I.

EXAMPLE III

In a run within the scope of this invention, with the addition of lithium chloride subsequent to the dehydration step, 65.2 g (60 percent assay, 0.5 mole) sodium sulfide, 0.2 g sodium hydroxide (to react with sodium bisulfide and sodium thiosulfate present in trace amounts in the sodium sulfide), and 158.3 g N-methyl-2-pyrrolidone were charged to a stirred 1-liter autoclave, which was then flushed with nitrogen. Dehydration of the mixture by heating to 205° C yielded 16 ml of distillate containing 14.3 g water. To the residual mixture were charged 21.2 g (0.5 mole) lithium chloride, 74.95 g (0.51 mole) p-dichlorobenzene, and 40 g N-methyl-2-pyrrolidone. The resulting mixture was heated for 3 hours at 265° C at a pressure of 75–110 psig. The reaction product was washed eight times with hot water and dried at 80° C under nitrogen in a vacuum oven to obtain a yield of 47.0 g poly(p-phenylene sulfide) having a melt flow of 683, an inherent viscosity of 0.24, a Tg of 85° C, and a $T_m$ of 283° C.

Thus, based on melt flow and inherent viscosity, the poly(p-phenylene sulfide) produced in this Example was of much higher molecular weight than that produced in Example I.

EXAMPLE IV

In a run within the scope of this invention, with the addition of lithium bromide subsequent to the dehydration step, 65.2 g (60 percent assay, 0.5 mole) sodium sulfide, 0.2 g sodium hydroxide (to react with sodium bisulfide and sodium thiosulfate present in trace amounts in the sodium sulfide), and 158.3 g N-methyl-2-pyrrolidone were charged to a stirred 1-liter autoclave, which was then flushed with nitrogen. Dehydration of the mixture by heating to 205° C yielded 15 ml of distillate containing 13.4 g water. To the residual mixture were charged 43.3 g (0.5 mole) lithium bromide, 74.95 g (0.51 mole) p-dichlorobenzene, and 40 g N-methyl-2-pyrrolidone. The resulting mixture was heated for 3 hours at 265° C at a pressure of 100–120 psig. The reaction product was washed eight times with hot water and dried at 80° C under nitrogen in a vacuum oven to obtain a yield of 48.2 g poly(p-phenylene sulfide) having a melt flow of 1160, an inherent viscosity of 0.23, a Tg of 83° C, and a $T_m$ of 286° C.

Thus, based on melt flow and inherent viscosity, the poly(p-phenylene sulfide) produced in this Example was of substantially higher molecular weight than that produced in Example I.

EXAMPLE V

In a run within the scope of this invention conducted essentially as the run in Example III except that the amount of lithium chloride used was 0.25 mole instead of 0.5 mole, there was obtained 42.8 g poly(p-phenylene sulfide) having a melt flow of 1160 and an inherent viscosity of 0.21. Thus, the polymer was of substantially higher molecular weight than that produced in Example I.

EXAMPLE VI

In a larger scale run within the scope of this invention, using sodium hydroxide as well as lithium chloride, 491.8 g (59.7 percent assay, 3.76 moles) sodium sulfide, 23.4 g (0.59 mole) sodium hydroxide, and 1500 ml (1539 g) N-methyl-2-pyrrolidone were charged to a stirred 2-gallon autoclave, which was then flushed with nitrogen. Dehydration of the mixture by heating to 400° F (204° C) yielded 140 ml of distillate comprising primarily water. To the residual mixture were charged 320 g (7.55 moles) lithium chloride, 1000 ml (1026 g) N-methyl-2pyrrolidone, and 568.5 g (3.87 moles)p-dichlorobenzene. The resulting mixture was heated for 3 hours at 510° F (266° C) at a maximum pressure of 130 psig. The reaction product was cooled, washed four times with water, and dried in a vacuum oven to obtain a yield of 301.8 g poly(p-phenylene sulfide) having a melt flow of 502 and an inherent viscosity of 0.25. Thus, the polymer was of desirably high molecular weight.

EXAMPLE VII

In an even larger scale run within the scope of this invention, using sodium hydroxide and a smaller amount of lithium chloride than that used in Example VI, 983.7 g (59.7 percent assay, 7.53 moles) sodium sulfide, 23.4 g (0.59 mole) sodium hydroxide, and 2500 ml (2565 g) N-methyl-2-pyrrolidone were charged to a stirred 2-gallon autoclave, which was then flushed with nitrogen. Dehydration of the mixture by heating to 410° F (210° C) yielded 310 ml of distillate comprising primarily water. To the residual mixture were charged 160 g (3.77 moles) lithium chloride, 1000 ml (1026 g) N-methyl-2-pyrrolidone, and 1137 g (7.73 moles) p-dichlorobenzene. The resulting mixture was heated for 3 hours at 510° ,F (266° C) at a maximum pressure of 150 psig. The reaction product was cooled, washed four times with water, and dried in a vacuum oven to obtain a yield of 590 g poly(p-phenylene sulfide) having a melt flow of 341 and an inherent viscosity of 0.23. Thus, the polymer had a desirably high molecular weight. A portion of this polymer, without prior curing, was spun into a fiber.

We claim:
1. A method for producing polymers comprising:
   a. forming a composition by contacting at least one p-dihalobenzene, at least one alkali metal sulfide, at least one organic amide, and at least one lithium halide, and
   b. maintaining at least a portion of said composition under polymerization conditions for a time sufficient to produce a polymer.
2. A method of claim 1 wherein said composition also contains a base.
3. A method of claim 1 wherein:
   a. at least one alkali metal sulfide, at least one lithium halide, and at least one organic amide are contacted to form a first composition,
   b. said first composition is dehydrated to form a first dehydrated composition, and
   c. at least one p-dihalobenzene is contacted with said first dehydrated composition under polymerization conditions for a period of time sufficient to form a p-phenylene sulfide polymer.
4. A method of claim 1 wherein:
   a. at least one alkali metal sulfide and at least one organic amide are contacted to form a first composition,
   b. said first composition is dehydrated to form a first dehydrated composition, and
   c. at least one p-dihalobenzene and at least one lithium halide are contacted with said first dehydrated composition under polymerization conditions for a period of time sufficient to form a p-phenylene sulfide polymer.

5. A method of claim 4 wherein at least one base is present in said first composition along with said alkali metal sulfide and said organic amide.

6. A method of claim 1 wherein the mole ratio of p-dihalobenzene to alkali metal sulfide is within the range of about 0.9:1 to about 2:1, the mole ratio of lithium halide to alkali metal sulfide is within the range of about 0.05:1 to about 1.5:1.

7. A method of claim 2 wherein the mole ratio of p-dihalobenzene to alkali metal sulfide is within the range of about 0.9:1 to about 2:1, the mole ratio of base to alkali metal sulfide is within the range of about 0.015:1 to about 0.8:1, and the mole ratio of lithium halide to alkali metal sulfide is within the range of about 0.05:1 to about 4:1.

8. A method of claim 3 wherein the mole ratio of p-dihalobenzene to alkali metal sulfide is within the range of about 0.9:1 to about 2:1, the mole ratio of lithium halide to alkali metal sulfide is within the range of about 0.05:1 to about 1.5:1.

9. A method of claim 4 wherein the mole ratio of p-dihalobenzene to alkali metal sulfide is within the range of about 0.9:1 to about 2:1, the mole ratio of lithium halide to alkali metal sulfide is within the range of about 0.05:1 to about 1.5:1.

10. A method of claim 5 wherein the mole ratio of p-dihalobenzene to alkali metal sulfide is within the range of about 0.9:1 to about 2:1, the mole ratio of base to alkali metal sulfide is within the range of about 0.015:1 to about 0.8:1, and the mole ratio of lithium halide to alkali metal sulfide is within the range of about 0.05:1 to about 4:1.

11. A method of claim 1 wherein the polymerization conditions comprise a reaction temperature within the range of about 125° C to about 450° C, a reaction pressure sufficient to maintain the p-dihalobenzene and organic amide substantially in the liquid phase, and the reaction time within the range of about 10 minutes to about 72 hours.

12. A method of claim 3 wherein the p-dihalobenzene is p-dichlorobenzene, the alkali metal sulfide is sodium sulfide, the lithium halide is lithium chloride, and the organic amide is N-methyl-2-pyrrolidone, the reaction temperature is within the range of about 175° C to about 350° C and the reaction time is within the range of about 1 to about 8 hours.

13. A method of claim 5 wherein the p-dihalobenzene is p-dichlorobenzene, the alkali metal sulfide is sodium sulfide, the lithium halide is lithium chloride, the organic amide is N-methyl-2-pyrrolidone, and the base is sodium hydroxide, the reaction temperature is within the range of about 175° C to about 350° C and the reaction time is within the range of about 1 to about 8 hours.

14. A method of claim 4 wherein the p-dihalobenzene is p-dichlorobenzene, the alkali metal sulfide is sodium sulfide, the lithium halide is lithium bromide, the organic amide is N-methyl-2-pyrrolidone, the reaction temperature is within the range of about 175° C to about 350° C and the reaction time is within the range of about 1 to about 8 hours.

15. A method of claim 4 wherein the p-dihalobenzene is p-dichlorobenzene, the alkali metal sulfide is sodium sulfide, the lithium halide is lithium chloride, the organic amide is N-methyl-2-pyrrolidone, the reaction temperature is within the range of about 175° C to about 350° C and the reaction time is within the range of about 1 to about 8 hours.

* * * * *